United States Patent [19]

Mezger

[11] Patent Number: 4,502,420
[45] Date of Patent: Mar. 5, 1985

[54] RECIPROCATING PISTON COMBUSTION ENGINE WITH WATER INJECTION

[75] Inventor: Hans Mezger, Freiberg, Fed. Rep. of Germany

[73] Assignee: Dr. Ing. h.c.F. Porsche Aktiengesellschaft, Fed. Rep. of Germany

[21] Appl. No.: 536,974

[22] Filed: Sep. 29, 1983

[30] Foreign Application Priority Data

Sep. 30, 1982 [DE] Fed. Rep. of Germany ....... 3236233

[51] Int. Cl.³ ............................................. F02M 25/02
[52] U.S. Cl. .................................. 123/25 C; 123/25 J; 123/25 M; 123/25 N
[58] Field of Search ................ 123/25 R, 25 A, 25 C, 123/25 D, 25 J, 25 M, 25 N, 198 A

[56] References Cited

U.S. PATENT DOCUMENTS

| | | | |
|---|---|---|---|
| 2,076,797 | 4/1937 | Taylor | 123/25 N |
| 2,509,648 | 5/1950 | Mock | 123/25 A |
| 2,548,150 | 4/1951 | Fox | 123/25 J |
| 3,490,422 | 1/1970 | Bullis | 123/25 R |
| 3,631,843 | 1/1972 | Yeiser | 123/25 M |
| 3,696,795 | 10/1972 | Smith et al. | 123/25 C |
| 4,004,554 | 1/1977 | Kosaka et al. | 123/25 R |
| 4,231,333 | 11/1980 | Thatcher et al. | 123/25 R |
| 4,322,950 | 4/1982 | Jepsen | 123/25 D |
| 4,377,135 | 3/1983 | Abthoff et al. | 123/25 J |

FOREIGN PATENT DOCUMENTS

| | | |
|---|---|---|
| 2154822 | 5/1972 | Fed. Rep. of Germany . |
| 2535041 | 2/1977 | Fed. Rep. of Germany . |
| 1235 | 1/1977 | Japan ................................ 123/25 N |
| 1234 | 1/1977 | Japan ................................ 123/25 N |

Primary Examiner—Ira S. Lazarus
Attorney, Agent, or Firm—Barnes & Thornburg

[57] ABSTRACT

A combustion engine with electromagnetic controlled fuel injection apparatus is provided with a water injection for short duration during load increases in order to prevent thermal damage. For this reason there are provided, in addition to the fuel injection valves, also water injection valves of the same construction and size, whereby all injection valves are operated by a common electrical control device one after the other in a cycling sequence.

16 Claims, 2 Drawing Figures

RECIPROCATING PISTON COMBUSTION ENGINE WITH WATER INJECTION

BACKGROUND AND SUMMARY OF THE INVENTION

The invention relates to a reciprocating piston combustion engine for vehicles of the type having fuel injection nozzles and water injection nozzles installed in the suction pipe arrangement, which nozzles are all electromagnetically operated.

According to the known combustion engine from the German published application (DE-AS) No. 1 115 518, the fuel and water are separated and injected with respective nozzles into the combustion space in order to improve the combustion process through the achieved dissociation of the split products.

On the other hand, the water injection should only result in an inner cooling, in order to avoid thermal damage occurring through short duration high loadings, exemplary resulting from accelleration for passing another motor vehicle or during the start of an airplane.

The problem of the invention consists in developing a suitable water injection for the fuel volume with constructively simple means and minimal assembly costs.

In order to solve this problem, the present invention provides at least one electromagnetic water injection valve controlled by the same commercially available electronic injection control device connected to the fuel injection valves in the same phase or cycle as the fuel injection valves. With a six cylinder motor with six injection valves, the valves are divided into two sets of three fuel injection valves and one water injection valve respectively. Because the duration of the injection time for all valves is similar and all are operated in a cycle sequence, the relationship between the injected fuel volume to the water volume is 3:1, which ratio is a proven desired arrangement for practical embodiments of the combustion engines. For a six cylinder engine, it is a very simple matter to utilize an injection control which is designed to be used for an eight cylinder combustion engine and simply substituted two water injection valves which are supplied with a water supply line or connection for two of the fuel injection valves.

For an eight cylinder combustion engine, three or four water injection nozzles are advantageously used so that the volume comparison to the fuel is in one case 25% and in the other case 50%.

Since the water injection is only necessary for a short duration during high loading conditions of the combustion engine, a water enabling device is used. In one embodiment, the water inlet to the water injection valve can be interrupted by the shutting off of the water pump for the water injection valves. Alternatively, the electrical connection from the control device to the water injection nozzle includes a switch built in, which institutes the water injection according to the closing position thereof. This switch, as well as the switch for the water pump, can be controlled independently by the load, the loading pressure or the temperature of the combustion engine, in order to achieve an automatic switching on of the water injection under thermally dangerous operation of the machine or controlled manually.

The water injection valves can be arranged on each of the respective inlet manifolds of the cylinders. With a combustion engine with turbocharger, it is contemplated to place the same at the inlet or pressure side of the compressor. In this manner, there will occur a fine water diffusion or atomization in the rotating airstream, which will achieve a dampening in the warm changing air and a cooling of the charging air. With such an arrangement, there will be achieved a fuel saving in conjunction with higher loads.

Other objects, advantages and novel features of the present invention will become apparent from the following detailed description of the invention when considered in conjunction with the accompanying drawings.

DETAILED DESCRIPTION OF THE DRAWINGS

Figure 1:
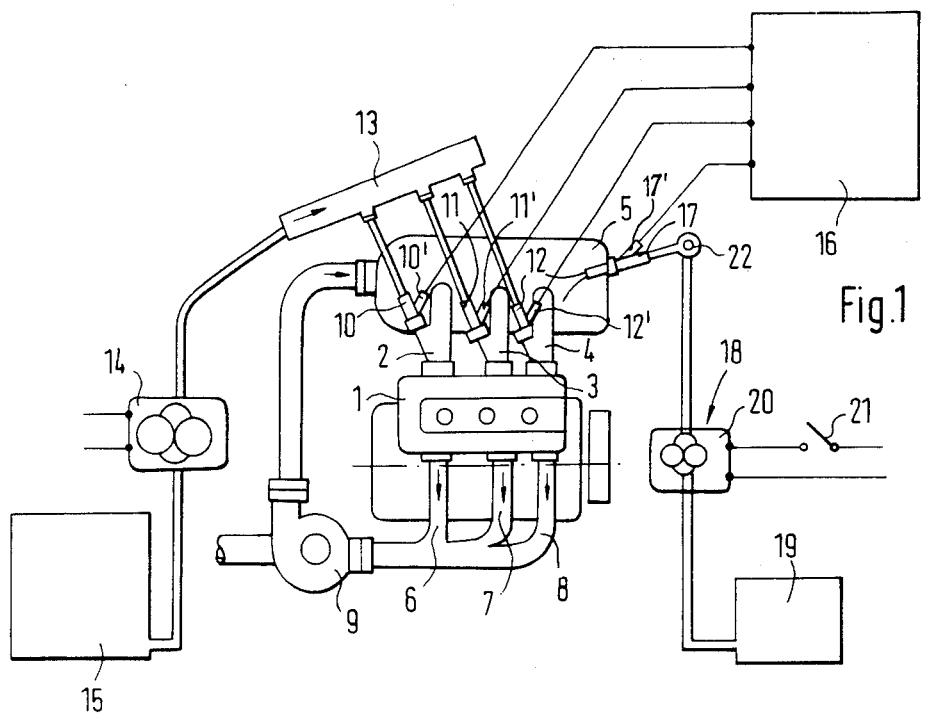
FIG. 1 is a diagram of a first embodiment of an injection control system incorporating the principles of the present invention.

As illustrared in FIG. 1, a cylinder head 1 of a six cylinder motor includes an inlet manifold 5 connected by three individual pipes 2, 3 and 4 to the inlet to three cylinders of the six cylinder engine. Three exhaust gas lines 6, 7 and 8 are connected together to a turbocharger 9 which provides charging air to the inlet manifold 5. Electromagnetically operated fuel injection valves 10, 11 and 12 are connected at lateral connection stubs of the individual pipes 2, 3 and 4. The fuel injection valves receive fuel by means of a fuel line 13 from fuel pump 14 and fuel tank 15. Electrical connections 10', 11' and 12' of the fuel injection valves 10, 11 and 12 are connected over corresponding lines with injection control device 16. The arrangement of the device so far is that of a standard fuel injection motor.

Also connected to the inlet manifold 5 is a water injection valve 17 which is supplied water by means of water pump 18 from water tank 19. Electrical connection 17' of the water injection valve 17 is connected over corresponding line with control device 16. An electric motor 20, being part of the water supply system, is enabled or disabled by switch 21 which connects to a source of electrical power. The switch 21 may be manually actuated or may be responsive to a characteristic of the vehicle, for example, the load, the load pressure or the temperature of the combustion engine. Ring line or connection 22 connects the manifold, not shown in FIG. 1, for the other three cylinders of the six cylinder engine.

In order to achieve a specific volume of water per volume of fuel, the electrical control device 16 operates the fuel injection valves 10, 11 and 12 in combination with water injection valves 17 in phase or in a cyclic operation. Thus, the electrical control device 16 may be a standard or commercially available eight cylinder fuel injection control system. Two of the eight fuel control signals are provided to the two water injection valves. Thus, the cyclic operation of an eight valve system is used to control six fuel valves and two water valves.

Figure 2:
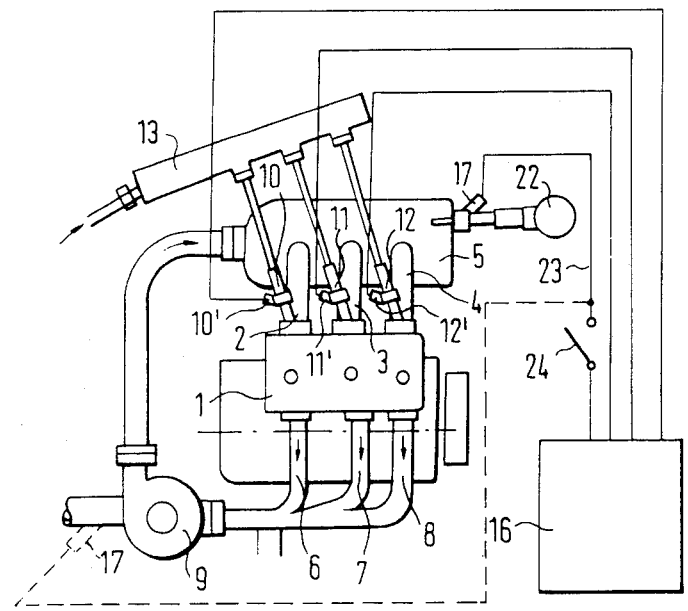
FIG. 2 is a diagram of a second embodiment of the injection system incorporating the principles of the present invention.

As illustrated in FIG. 2, the water pump 18 is connected to a water injection valve 17 via the ring line or connection 22. This type of connection is what would be used for the second water injection valve of the embodiment of FIG. 1. The main difference between the embodiment of FIG. 1 and the embodiment of FIG.

2, is that in FIG. 2 the enable switch 24 is connected between the output of the electrical control device 16 and the input to the electromagnetic water valve 17. Thus, when the enable switch 24 is closed, the cyclic control signals from the control device 16 will activate the water injection valve 17 whereas when the switch is open, the output signals from the electrical control device 16 will not control the water injection valve 17.

It should be noted that all the valves 10, 11, 12 and 17 are of the same type of construction with the injection volume being proportional to the opening time as controlled by the electrical control device 16. Thereby with sequential cyclic operation of the valves, the injected fuel volume to water volume ratio is always 3:1 for a six cylinder motor having two common intake manifolds and two water injection valves. This ratio has been found to be most advantageous for six cylinder engines. Other combination and ratios may be achieved for six cylinder engines as well as for eight and other numbered cylinder engines. Although commercially available electrical control device 16 has been suggested, specially designed systems may be used if an appropriate type control system cannot be found.

Although the water injection valve 17 has been shown to be connected to the inlet manifold 5, in certain applications it may be desirable to provide the water injection on the inlet side of the compressor of the supercharger 9. This allows the compressor 9 to atomize the water and further cool the supercharged air coming into the inlet manifold 5.

From the preceding description of the preferred embodiment, it is evident that the objects of the invention are attained and although the invention has been described and illustrated in detail, it is to be clearly understood that the same is by way of illustration and example only and is not to be taken by way of limitation. The spirit and scope of the present invention are to be limited only by the terms of the appended claims.

What is claimed is:

1. In a reciprocating piston combustion engine for a motor vehicle having a plurality of cylinders, a fuel injection system having N fuel injection valves and control means for controlling the operation of the fuel injection valves, and at least one water injection valve for the engine, the improvement comprising:
    said water injection valve having the same construction as said fuel injection valves; and
    said control means having at least (N+1) similar control outputs for controlling the operation of said fuel and water injection valves in a substantially similar manner over a range of engine operating conditions.

2. The reciprocating piston combustion engine according to claim 1, wherein the engine has a fuel injection valve for each of said plurality of cylinders.

3. The reciprocating piston combustion engine according to claim 2 including an inlet manifold common to a subgroup of cylinders and said water injection valve injects water into said common inlet manifold.

4. The reciprocating piston combustion engine according to claim 3 including a plurality of inlet manifolds common to a respective subgroup of cylinders and a water injection valve for each common manifold.

5. The reciprocating piston combustion engine according to claim 4 including individual pipes connecting said cylinders to a respective inlet manifold and said fuel injection valves inject fuel into a respective pipe.

6. The reciprocating piston combustion engine according to claim 3 wherein said subgroup includes three cylinders.

7. The reciprocating piston combustion engine according to claim 2 including enabling means connected to said water injection valve for enabling injection of water under the control of said control means.

8. The reciprocating piston combustion engine according to claim 7 wherein said enabling means is manually actuated.

9. The reciprocating piston combustion engine according claim 8 wherein said enabling means monitors a characteristic of said vehicle and actuates said enabling means in response to said monitored characteristic.

10. The reciprocating piston combustion enging according to claim 7 wherein said enabling means monitors a characteristic of said vehicle and actuates said enabling means in response to said monitored characteristic.

11. The reciprocating piston combustion engine according to claim 7 wherein said enabling means interconnects said control means and said water injection valve for enabling and disabling transmission of control signals from said control means to said water injection valve.

12. The reciprocating piston combustion engine according to claim 2 including a water pump and a water reservoir connected to said water injection valve and enabling means for enabling said water pump.

13. The reciprocating piston combustion engine according to claim 12 wherein said enabling means is manually actuated.

14. The reciprocating piston combustion engine according to claim 13 wherein said enabling means monitors a characteristic of said vehicle and actuates said enabling means in response to said monitored characteristic.

15. The reciprocating piston combustion engine according to claim 12 wherein said enabling means monitors a characteristic of said vehicle and actuates said enabling means in response to said monitored characteristic.

16. The reciprocating piston combustion engine according to claim 2 including a compressor means whose outlet is connected to said inlet manifold for charging said inlet manifold and said water injection valve is on the inlet of said compressor means to atomize said injected water.

* * * * *

UNITED STATES PATENT AND TRADEMARK OFFICE
CERTIFICATE OF CORRECTION

PATENT NO. : 4,502,420

DATED : March 5, 1985

INVENTOR(S) : Hans Mezger

It is certified that error appears in the above-identified patent and that said Letters Patent is hereby corrected as shown below:

Column 2, line 23 in "Detailed Description of the Drawings". "illustrared" is corrected to --illustrated--

Signed and Sealed this

Sixteenth Day of July 1985

[SEAL]

Attest:

DONALD J. QUIGG

Attesting Officer         Acting Commissioner of Patents and Trademarks